(12) United States Patent
Barrellon et al.

(10) Patent No.: US 10,180,150 B2
(45) Date of Patent: Jan. 15, 2019

(54) FASTENING DEVICE AND A FASTENING METHOD FOR REVERSIBLY ASSEMBLING TWO VEHICLE COMPONENTS

(71) Applicant: VOLVO TRUCK CORPORATION, Göteborg (SE)

(72) Inventors: Remi Barrellon, Simandres (FR); Andre Comiotto, Chassieu (FR); Olivier Negri, Saint Priest (FR); Ryme Sebky, Lyons (FR)

(73) Assignee: Volvo Truck Corporation, Göteborg (SE)

( * ) Notice: Subject to any disclaimer, the term of this patent is extended or adjusted under 35 U.S.C. 154(b) by 287 days.

(21) Appl. No.: 15/033,912

(22) PCT Filed: Oct. 21, 2013

(86) PCT No.: PCT/IB2013/003032
§ 371 (c)(1),
(2) Date: May 3, 2016

(87) PCT Pub. No.: WO2015/059510
PCT Pub. Date: Apr. 30, 2015

(65) Prior Publication Data
US 2016/0319852 A1    Nov. 3, 2016

(51) Int. Cl.
*F16B 2/16*    (2006.01)

(52) U.S. Cl.
CPC .......... *F16B 2/16* (2013.01); *B60K 2350/941* (2013.01)

(58) Field of Classification Search
CPC ........ F16B 2/16; Y10T 24/32; A44D 2203/00
See application file for complete search history.

(56) References Cited

U.S. PATENT DOCUMENTS

| 331,088 | A | * | 11/1885 | Sackett | ...................... B68B 5/00 54/74 |
| 3,197,250 | A | * | 7/1965 | Trotta | ...................... B66C 1/48 294/102.1 |
| 3,653,708 | A | | 4/1972 | Merola | |

(Continued)

FOREIGN PATENT DOCUMENTS

| DE | 19805538 A1 | 8/1999 |
| DE | 20318858 U1 | 4/2005 |
| FR | 2740892 A1 | 5/1997 |

OTHER PUBLICATIONS

International Search Report (dated Sep. 14, 2014) for corresponding International App. PCT/IB2013/003032.

*Primary Examiner* — Robert Sandy
(74) *Attorney, Agent, or Firm* — WRB-IP LLP (57) ABSTRACT

A fastening device includes a male part secured to a first component and including a plate member, a female part secured to a second component and presenting a slot for inserting the plate member, a friction retainer including a friction zone and movable between a locking position, where each friction zone is in frictional engagement with the plate member, and a releasing position, where the plate member may be removed from the slot, a biasing component to bias each friction retainer towards the locking position so as to prevent the plate member from moving. Each friction retainer is composed of a magnetic material so that a magnetic force can move each friction retainer towards the releasing position and against the biasing component.

22 Claims, 6 Drawing Sheets

(56) References Cited

U.S. PATENT DOCUMENTS

| | | | | |
|---|---|---|---|---|
| 4,831,693 A | * | 5/1989 | Veith | B25B 5/006 24/136 A |
| 4,956,899 A | | 9/1990 | Green | |
| 6,065,897 A | * | 5/2000 | Lutz, III | B25B 5/08 254/104 |
| 6,415,476 B1 | * | 7/2002 | McCoy | E05B 15/10 16/224 |
| 2003/0080079 A1 | * | 5/2003 | Wu | F16B 2/16 211/89.01 |
| 2008/0209696 A1 | * | 9/2008 | Lewis | F16B 2/16 24/523 |

* cited by examiner

FASTENING DEVICE AND A FASTENING METHOD FOR REVERSIBLY ASSEMBLING TWO VEHICLE COMPONENTS

BACKGROUND AND SUMMARY

The present invention relates to a fastening device for reversibly assembling a first vehicle component and a second vehicle component. Besides, the present invention relates to a fastening method, for reversibly assembling a first vehicle component and a second vehicle component.

Document DE102008033110A1 discloses a fastening device for reversibly assembling two components and including a male part, a female part presenting an opening for inserting the male part and two engaging balls movable between a locking position and a releasing position. Each engaging ball is biased by a spring towards the locking position. The male part has a circumferential groove for partly receiving the engaging balls. In the locking position, the engaging balls are engaged in the circumferential groove in order to retain by abutment the male part.

In DE102008033110A1 to move the engaging balls in a release position, it is necessary to pull back the male part from the female part of the fastening device, in order to disengage the engaging balls from the circumferential groove and to overcome the biasing force generated by each spring. A main drawback of the fastening device DE102008033110A1 is that the biasing force required to lock the fastening device must be strong enough to maintain both the male part and the female part in an assembled state, whereas in the other side this biasing force should not be too strong, in order to allow disassembling of the male part and the female part. Therefore, in DE10200803311 it is not possible to achieve both a strong fastening and an easy disassembling process.

For instance, the fastening device of DE102008033110A1 is not suitable to fasten various vehicle components, in particular dashboard components, which request a reliable assembling to withstand for instance vehicle vibrations, but which must also be easily removable in particular for maintenance.

Besides, since the fastening device of DE102008033110A1 has a complex structure, in particular due to the radial arrangement of its locking elements (i.e. engaging balls, springs . . . ), the fastening device of DE102008033110A1 cannot achieve a strong fastening together with a compact design.

It therefore appears that, from several standpoints, there is room for improvement in the panel frames of a vehicle.

It is desirable to provide a fastening device enabling an operator to quickly and reliably assemble by hand a first vehicle component and a second vehicle component.

A subject-matter of the invention is a fastening device, for reversibly assembling a first vehicle component and a second vehicle component, wherein the fastening device includes at least:

a male part suitable for being secured to a first vehicle component, for example a dashboard, the male part comprising a plate member, a female part suitable for being secured to a second vehicle component, for example a dashboard component, said female part presenting a slot suitable for the insertion of said plate member, at least one friction retainer comprising a friction zone, the friction retainer being movable at least between:

a locking position, in which said at least one friction zone is in frictional engagement with said plate member when said plate member is inserted through said slot, and a releasing position, in which said at least one friction zone is not in frictional engagement with said plate member such that said plate member may be removed from said slot, at least one biasing component arranged to bias said at least one friction retainer towards the locking position such that said friction zone is in frictional engagement with said plate member so as to prevent said plate member from moving relative to said slot, wherein said at least one friction retainer is at least partially composed of a magnetic material such that a predetermined magnetic force can move said at least one friction retainer towards the releasing position and against a biasing force generated by the biasing component.

Thus, such a fastening device enables an operator to reliably assemble a first vehicle component and a second vehicle component by hand, hence without any tool. The frictional engagement generates a "locking force" between these vehicle components. Besides, such a fastening device enables an operator to disassemble these vehicle components using solely a magnetic tool that can be part of the fastening device or distinct from the fastening device. The assembling step only requires the operator to push the male part through the slot of the female part. Quick and easy assembling and disassembling help decrease the production costs.

Besides, the use of the plate member of the present invention allows the fastening device to withstand high traction forces while preserving a compact design.

Throughout the present application, the expression "magnetic materials" refers to any material able to generate, under a predetermined magnetic force, a magnetic coupling stronger than the forces exerted by the biasing component. Thus, the predetermined magnetic force can move the friction retainer(s) against the forces exerted by the biasing component(s). Examples of magnetic materials may be, for instance, a ferromagnetic material.

According to the invention, the magnetic material is preferably selected in the groups consisting of neodyme-ferbore alloys or AlNiCo alloys. Preferably, the friction retainer is comprised of a magnetic material, whereas at least the male part and the female part of the fastening device can be composed of non-magnetic materials.

According to an embodiment, said at least one friction zone extends substantially along a friction line.

Thus, such a friction line defines a relatively large friction zone, which enables the fastening device to generate a large "locking force" or, in other words, to withstand a high traction force exerted upon the male part.

According to an embodiment, said at least one friction line is straight, wherein said plate member has a planar friction area arranged to cooperate with said at least one friction zone to generate a friction force that provides a locking force able to withstand a high traction force exerted upon the male part, and wherein said slot has a substantially rectangular form.

Thus, such a rectilinear friction line and planar friction area make it possible to design a fastening device with simple, hence cheap parts or components.

According to an embodiment, said plate member has a substantially rectangular cross-section, across a plane perpendicular to the insertion direction of the plate member into said slot, said rectangular cross-section having a length over thickness ratio greater than 4, preferably greater than 8.

Thus, such a length over thickness ratio imparts the fastening device a high tensile strength so as to generate a large "locking force" yet with limited impact on the overall dimensions of the fastening device.

According to an alternative embodiment, said at least one friction line is curved, said slot being curved, each friction retainer has a substantially ellipsoidal shape, and said plate member has a cylindrical friction area arranged to engage with said at least one friction zone. Thus, such a curved friction line enables to increase the area of the friction zone.

According to a variant, said at least one friction zone is continuous along said friction line. Thus, such a continuous friction zone enables the fastening device to maximize the "locking force" while keeping a short plate member.

According to an embodiment, said at least one friction retainer is located in the female part.

Thus, the fastening device can be closed, which prevents any unexpected foreign matter to block the movement of the friction retainer(s). Besides, thanks to this arrangement, the fastening device can be optimized so that it can be compact and have small overall dimensions.

According to an embodiment, the fastening device includes at least two friction retainers, each friction retainer being located on either side of said slot.

Thus, two friction retainers enable the fastening device to generate a stronger "locking force".

According to an embodiment, said at least one biasing component is connected to the female part and is preferably arranged inside the female part.

Thus, the fastening device can be quite compact, as the fastening device does not require any supplementary part between the biasing component and the female part. Throughout the present application, the term "connected to" and its derivatives refers to any direct or indirect mechanical connection, namely through zero, one or more intermediate component. Throughout the present application, the term "bias" and its derivatives refers to any direct or indirect generation of a biasing force, namely through zero, one or more intermediate component.

According to an embodiment, said at least one biasing component comprises at least one spring arranged to bias said at least one friction retainer, preferably in a biasing direction substantially perpendicular to said slot, said at least one spring preferably being a compression helicoidal spring.

Thus, the spring(s) form a biasing component which is simple and inexpensive to manufacture and assemble.

Preferably, the movable parts, comprising said at least one friction retainer and said at least one biasing component, are movable according to a direction that is substantially parallel to an insertion direction of said male part through said slot.

This arrangement contributes to the compactness of the fastening device.

According to a variant, the fastening device further includes a cover located on the female part and opposite said slot, said cover forming an abutment for each spring. Thus, such a cover ensures a correct location for the spring(s) while the fastening device has a relatively small number of components.

According to an embodiment, the fastening device further includes a pressure element arranged inside the female part between said at least one biasing component and said at least one friction retainer so as to transmit forces from said at least one biasing component to said at least one friction retainer, said pressure element being slidable according to a direction that is substantially parallel to an insertion direction of said male part through said slot.

Thus, such a pressure element achieves a distribution of the biasing force from the biasing component onto a large area of the friction retainer(s). Besides, the pressure element may help guiding the biasing component and/or the friction retainer(s).

According to an embodiment, said at least one friction retainer comprises a cylinder having a circular cross-section and extending substantially parallel to said slot, said cylinder being free to move inside said female part when said friction retainer lies in the releasing position.

Thus, such a cylinder provides a friction retainer which can generate a large "locking force" while allowing an easy insertion of the plate member through the slot.

According to an embodiment, the fastening device further includes at least one guide part arranged to guide said cylinder towards said slot.

Thus, such a guide part helps distributing compression by the biasing component(s) on the cylinder(s). The guide part may also prevent any unexpected displacement of the cylinder(s), which could lead to a jamming or overhanging position of the cylinder(s). The guide part(s) can guide the cylinder(s) towards the slot when the biasing component biases the friction retainer(s) towards the locking position.

According to a particular embodiment, the fastening device further includes at least two guide parts, wherein each friction retainer comprises a cylinder extending substantially parallel to said slot, guide parts extending on either side of said slot to guide a respective cylinder when it moves from the releasing position to the locking position, that is to say, when it moves towards said slot.

Thus, two cylinders and guide parts enable the fastening device to generate a double "locking force".

According to an embodiment, said at least one guide part comprises a wall of the female part, said wall defining a gap progressively narrowing towards said slot, preferably said wall progressively curving towards said slot.

According to a variant, said at least one guide part comprises a concave surface of the pressure element facing said slot. Thus, such a concave surface enables to efficiently guide the friction retainer(s).

According to an embodiment, a primary ratio where:—the numerator is the radius of said at least one cylinder, and the denominator is the thickness of the rectangular cross-section of the plate member that is greater than 1, preferably greater than 2.

Thus, such a primary ratio enables the fastening device to generate a large "locking force".

According to another embodiment, said at least one friction retainer comprises an arm extending parallel to said slot, each arm being arranged to pivot with respect to the female part about an axis substantially parallel to said slot.

Thus, such an arm enables the fastening device to generate a large "locking force", while its pivoting arrangement enables an easy insertion of the plate member through the slot.

According to a variant, the fastening device further includes at least a hinge for each respective arm, each hinge preferably linking a respective arm to the female part. Thus, such a hinge allows the pivoting movement of the friction retainer made of an arm.

According to a variant, the or each arm is formed by a rectangular plate and said hinge is located on one edge of said rectangular plate. Thus, such an arm is easy and inexpensive to manufacture and to assemble.

According to a variant, the or each arm is designed so as to maximize the surface of contact between said plate member and a respective friction zone. Thus, such an arm enables the fastening device to generate a maximal "locking force".

According to an embodiment, each friction retainer comprises a corresponding arm extending parallel to said slot.

Thus, two retainers enable the fastening device to generate a double "locking force".

According to an embodiment, said at least one biasing component comprises at least one torsion spring arranged to bias said at least one friction retainer in a biasing direction substantially perpendicular to said slot, said at least one torsion spring preferably being a torsion helicoidal spring.

Thus, such a torsion spring ensures the movement of the friction retainer returning to its locking position.

According to an embodiment, said friction zone is defined by a rounded edge of said arm.

Thus, such a rounded edge ensures a large area of the friction zone, which in turn ensures a large "locking force" for the fastening device.

According to an embodiment, said at least one arm is designed to define, in its locking position, a lock gap having a width smaller than the width of said slot when measured perpendicularly to the insertion direction of said plate member.

Thus, such a lock gap enables the arm to generate a large "locking force".

According to an embodiment, said plate member and said at least one arm are designed such that, in the locking position, the angle between the arm and a direction perpendicular to the plate member is in the range of 5 to 25°.

Thus, such an angle allows the plate member to be locked in the slot against removal forces when the or each friction retainer is in the locking position, while such an angle allows an easy removal of the plate member when the or each friction retainer is in the releasing position.

According to an embodiment, the fastening device further includes at least one magnet manually movable between:

a lock position, in which the magnetic force exerted by said at least one magnet on said at least one friction retainer is substantially smaller than the biasing force exerted by said at least one biasing component on said at least one friction retainer, so that said at least one friction retainer is kept in its locking position, and a release position, in which the magnetic force exerted by said at least one magnet on said at least one friction retainer is substantially greater than the biasing force exerted by said at least one biasing component on said at least one friction retainer, so that said at least one friction retainer is moved towards its releasing position.

Thus, such a magnet makes it possible to easily remove the plate member from the slot, thus to disassemble the vehicle components.

According to a variant, the fastening device includes at least two magnets. Thus, two magnets ensure that the friction retainer(s) will not unwittingly move to the releasing position. Indeed, it takes two magnets at suitable locations to release the plate member.

Said at least one magnet can be located on a side surface of the fastening device that is opposite to the slot with respect to said at least one friction retainer. Preferably, said at magnet is located on the cover of the fastening device. Thus, such a magnet location enables an easy release of the friction retainer(s), hence an easy removal of the plate member. Preferably said at least one magnet is fixed on said side surface of the fastening device in a sliding manner to be manually moved between the lock position and the release position.

According to a variant, said at least one magnet is part of a supporting member or part of a holding plate tool that is distinct from the fastening device.

Another subject-matter of the invention is a fastening method, for reversibly assembling a first vehicle component and a second vehicle component, wherein the fastening method includes the steps of:

supplying a fastening device according to any preceding embodiment, inserting said plate member into said slot until said at least one biasing component has moved said at least one friction retainer in its locking position.

These and other features and advantages will become apparent upon reading the following description in view of the drawings appended thereto, which represent, as non-limiting examples, embodiments of a fastening device according to the invention.

BRIEF DESCRIPTION OF THE DRAWINGS

The following detailed description of several embodiments of the invention is better understood when read in conjunction with the appended drawings. However, the invention is not limited to the specific embodiments disclosed herewith.

FIG. 36 is a schematic cross-sectional view of a fastening device according to a third embodiment of the invention, with a friction retainer in a locking position; and FIG. 37 is a view similar to FIG. 36, where the male part is partially inserted in the female part.

DETAILED DESCRIPTION

FIGS. 1 to 12 illustrate a fastening device 1 including a male part 2 and a female part 4. Male part 2 is, for instance, suitable for being secured to a first vehicle component such as a truck dashboard 11 schematically illustrated on FIGS. 15 to 17 and on FIGS. 22, 24, while female part 4 is, for instance, suitable for being secured to a second vehicle component such as a truck dashboard component 12 schematically illustrated on FIGS. 15 to 20 and FIGS. 23, 24. Fastening device 1 enables to assemble the truck dashboard 11 and the truck dashboard component 12 in a quick, reliable and reversible manner.

Male part 2 comprises a plate member 2.0, while female part 4 presents a slot 5 suitable for the insertion of the plate member 2.0. In other words, the cross-sectional dimensions of slot 5 are larger than the cross-sectional dimensions of plate member 2.0. The slot 5 has herein a substantially rectangular shape.

Figure 1:
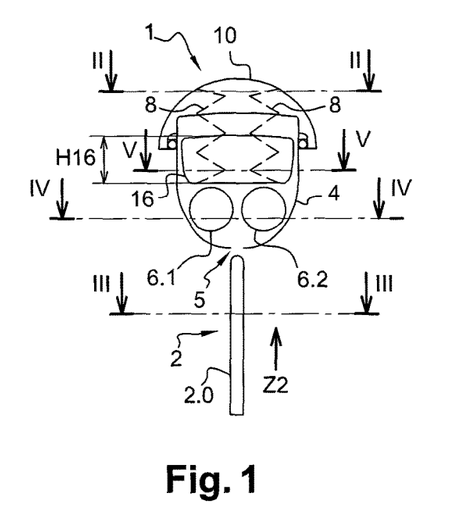
FIG. 1 is a schematic transversal cross-sectional view taken on line 1-1 at FIG. 2 of a fastening device according to a first embodiment of the invention, where a male part is released from a female part.
Figure 2:
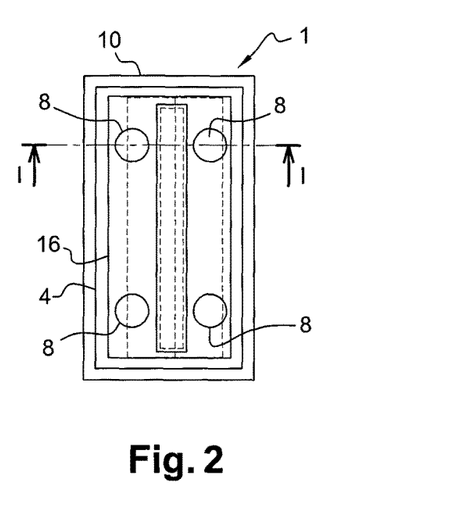
FIG. 2 is a schematic longitudinal cross-sectional view taken on line 11-11 at FIG. 1 of the fastening device of FIG. 1.

As visible on FIGS. 1 and 2, fastening device 1, for instance, includes two friction retainers 6.1 and 6.2 and four biasing components 8. Each friction retainer 6.1 or 6.2 comprises a friction zone 7.1 or 7.2 depicted on FIG. 11. The friction retainers 6.1 and 6.2 are movable between:

a locking position (FIGS. 11 and 12), in which the friction zones 7.1 and 7.2 are in frictional engagement with the plate member 2.0 when plate member 2.0 is inserted through slot 5, and a releasing position (FIGS. 13 and 14), in which the friction zones 7.1 and 7.2 are not in frictional engagement with plate member 2.0 such that the plate member 2.0 may be removed from slot 5.

The biasing components 8 are arranged to bias the friction retainers 6.1 and 6.2 towards the locking position (FIGS. 11 and 12) such that said frictional engagement prevents the plate member 2.0 from moving relative to the slot 5. In the example of FIGS. 1 to 14, the biasing components 8 comprise four helicoidal springs which are arranged to bias the friction retainers 6.1 and 6.2 in a biasing direction substantially perpendicular to slot 5.

The fastening device further includes a cover 10 which is located on the female part 4 and opposite the slot 5. The biasing components 8 are connected to the female part 4 and they are preferably arranged inside the female part 4. They can either be secured to a cover 0 of the female part 4 or simply bear against cover 10 to form a planar joint linkage. Cover 10 thus forms an abutment for each biasing component 8.

Figure 7:
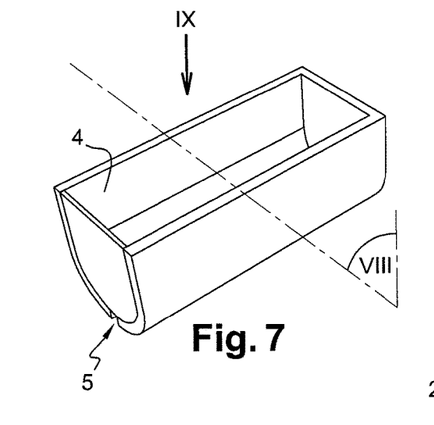
FIG. 7 is a perspective view of a female part belonging to the fastening device of FIG. 1.

The female part 4 has the general shape of a semi-cylindrical housing, as visible on FIG. 7. Each friction retainer 6.1 or 6.2 is located in the female part 4 on a respective side of slot 5. Hence, friction retainer 6.1 bears against one side of plate member 2.0 while friction retainer 6.2 bears against the other side of plate member 2.0.

Besides, the friction retainers 6.1 and 6.2 are herein composed of a ferromagnetic material. A predetermined magnetic force can move the friction retainers 6.1 and 6.2 towards the releasing position (FIG. 13 or 14), hence away from the locking position. Preferably, at least male part 2 and female part 4 are made of non-magnetic materials.

The plate member 2.0 is herein designed as a rectangular plate.

Figure 3:
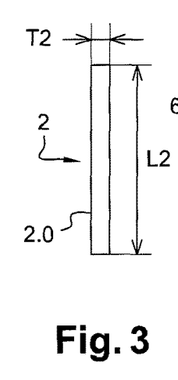
FIG. 3 is a schematic longitudinal cross-sectional view taken on line III-III at FIG. 1 of the fastening device of FIG. 1.
Figure 4:
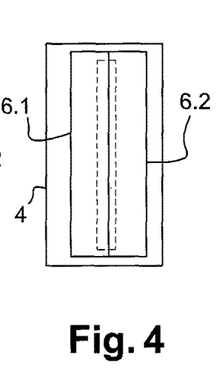
FIG. 4 is a schematic longitudinal cross-sectional view taken on line IV-IV at FIG. 1 of the fastening device of FIG. 1.
Figure 5:
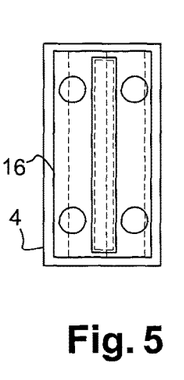
FIG. 5 is a schematic longitudinal cross-sectional view taken on line V-V at FIG. 1 of the fastening device of FIG. 1.
Figure 6:
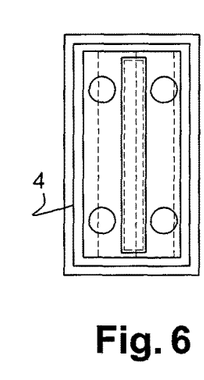
FIG. 6 is a schematic longitudinal cross-sectional view taken on line 11-11 at FIG. 1 of the fastening device of FIG. 1.
Figure 11:
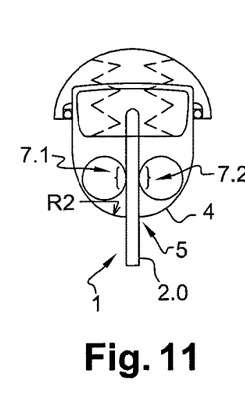
FIG. 11 is a view similar to FIG. 1, the male part being inserted into the female part, the friction retainer being in a locking position.

As visible on FIG. 3, plate member 2.0 has a substantially rectangular cross-section across a plane perpendicular to the insertion direction of the plate member 2.0 into slot 5 (FIG. 11). This rectangular cross-section has a ratio of the length L2 over the thickness T2 which is approximately equal to 10.

Each friction retainer 6.1 or 6.2 herein comprises a cylinder having a circular cross-section and extending substantially parallel to slot 5. Each cylindrical friction retainer 6.1 or 6.2 is free to move inside the female part 4 when the friction retainer 6.1 or 6.2 lies in the releasing position (FIG. 1).

Regarding dimensions (FIG. 10) defining the dimensions of the fastening device 1, a primary ratio is herein equal to 1.5, where:

the numerator of the primary ratio is the radius R6 of a cylinder forming the friction retainer 6.1 or 6.2, and the denominator of the primary ratio is the thickness T2 of the rectangular cross-section of the plate member 2.0.

The friction zone 7.1 or 7.2 herein extends continuously along a friction line, which is preferably defined as a straight line by the intersection between the rectangular plate belonging to the plate member 2.0 and each cylindrical friction retainer 6.1 or 6.2. The plate member 2.0 has a planar friction area arranged to engage with each friction zone 7.1 or 7.2.

Furthermore, the fastening device 1 may include a pressure element 16 arranged inside the female part 4 respectively between each biasing component 8 and each friction retainer 6.1 or 6.2 so as to transmit forces from the biasing components 8 to the friction retainers 6.1 and 6.2.

The pressure element 16 is slidable substantially along an insertion direction Z2 (FIG. 1) of the male part 2 through slot 5, The fastening device 1 also includes two guide parts 21 which are arranged to guide the cylindrical friction retainers 6.1 and 6.2 towards slot 5, in particular when the biasing components 8 bias the friction retainers 6.1 and 6.2 towards the locking position (FIG. 11).

Each guide part 21 is herein arranged along a respective side of said slot 5 to guide a cylindrical friction retainer 6.1 or 6.2. More precisely friction retainer 6.1 or 6.2 are guided, thanks to the guide parts and towards slot 5, when they move from the releasing position (FIG. 1) to the locking position (FIG. 1). Both guide parts 21 are formed by walls of the female part 4. These walls are shaped so that they define a gap 22 progressively narrowing towards slot 5, as can be seen on FIGS. 1, 7 to 14 and especially on FIG. 8. Preferably, each guide part 21 curves towards the slot 5 with a radius of curvature that is herein decreasing towards the slot 5, as visible on FIGS. 11 and 12 when comparing curvature radius R1 (larger) to curvature radius R2 (smaller). Alternatively, the curvature radius could be constant along each guide part 2.

As can be seen on FIGS. 13 to 20, the fastening device 1 may include at least one magnet 30 an preferably two magnets 30 (FIGS. 15 to 20) which are manually movable between:
- a lock position (FIGS. 15 and 20), in which the magnetic force exerted by the magnets 30 on each friction retainer 6.1 and 6.2 is substantially smaller than the biasing force exerted by the biasing components 8 on each friction retainers 6.1 and 6.2, so that each friction retainer 6.1 and 6.2 is kept in its locking position (FIGS. 1, 10 to 12), and
- a release position (FIGS. 13, 14, 16 and 19), in which the magnetic force exerted by the magnets 30 on each friction retainer 6.1 and 6.2 is substantially greater than the biasing force exerted by the biasing components 8 on each friction retainer 6.1 and 6.2, so that each friction retainer 6.1 and 6.2 is moved towards its releasing position, as illustrated by the sequence of FIGS. 15 to 18.

Figures 13, 14, 15, 16, 17:
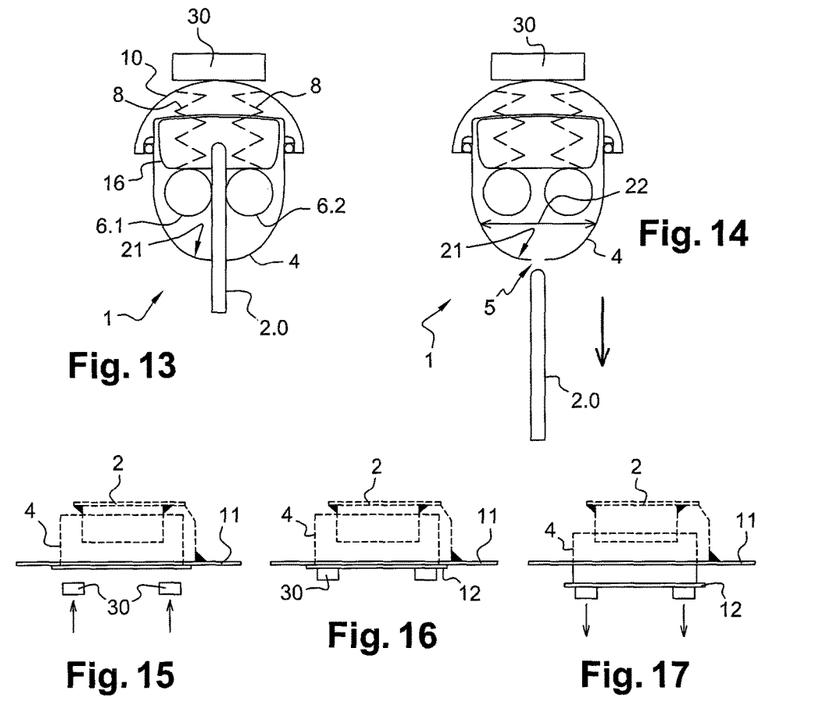
FIG. 13 is a view similar to FIG. 1, where the fastening device includes at least one magnet represented in a release position.
FIG. 14 is a view similar to FIG. 13, where the male part is released from the female part.
FIG. 15 is a schematic longitudinal view of the fastening device of FIG. 13, where two magnets are approached to the female part.
FIG. 16 is a schematic longitudinal view of the fastening device of FIG. 13, where two magnets are placed in the release position.
FIG. 17 is a schematic longitudinal view of the fastening device of FIG. 13, where the male part is partially released from the female part.

As can be seen on FIG. 13, the magnets 30 are located on a side surface of the fastening device that is opposite to the slot 5 with respect to friction retainer 6.1 or 6.2. For instance and such as depicted on FIG. 13 the magnets 30 are located on the cover 10 of the fastening device.

In service, an operator can perform a fastening method according to the invention for reversibly assembling the truck dashboard component 12 onto the truck dashboard 11. This fastening method includes the steps of:
- supplying fastening device 1,
- inserting the plate member 2.0 into slot 5 until the biasing components 8 has moved each cylindrical friction retainer 6.1 and 6.2 in their locking position (FIG. 11), and until the truck dashboard component 12 abuts against the truck dashboard 1.

While plate member 2.0 is inserted into the slot 5, the spring biasing components 8 keep on pushing (downwards on FIG. 10) each cylindrical friction retainer 6.1 and 6.2, via pressure element 16, against the guide parts 21, ie the opposite side walls of the female part 4 which extend on either side of the slot 5.

As the guide parts 21 define a gap 22 which progressively narrows towards slot 5, the biasing forces generated by biasing components 8 and transmitted via the pressure element 16 to the cylindrical friction retainers 6.1 and 6.2 push them to slide along the guide parts 21 towards the slot 5 until they are radially pressed against each other (see FIG. 1).

Figure 12:
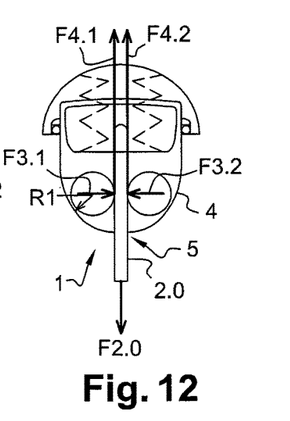
FIG. 12 is a view similar to FIG. 1, the friction retainer being in the locking position, the male part being submitted to a traction force.

As visible on FIG. 12, due to the progressively narrowing shape of the guide parts 21 and due to the biasing forces generated by biasing components 8 towards slot 5, as soon as the plate member 2.0 is engaged between the cylindrical friction retainers 6.1 and 6.2, some initial pinch forces F3.1 and F3.2 are generated between the plate member 2.0 and each cylindrical friction retainer 6.1 or 6.2. The pinch forces F3.1 and F3.2 are called "pinch", because they tend to pinch or press the plate member 2.0 in a transversal direction with respect to the direction of insertion of the plate member 2.0 in the slot 5.

Figure 8:
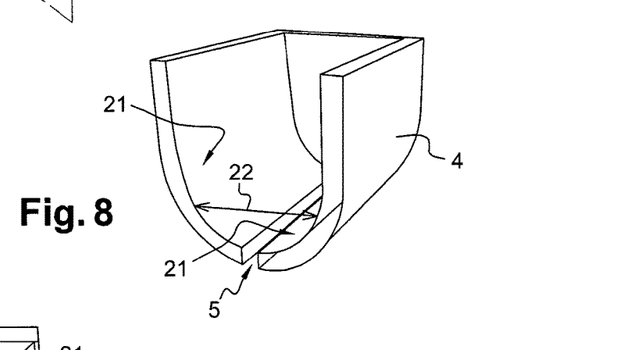
FIG. 8 is a sectional view taken on plane VIII at FIG. 7.
Figure 9:
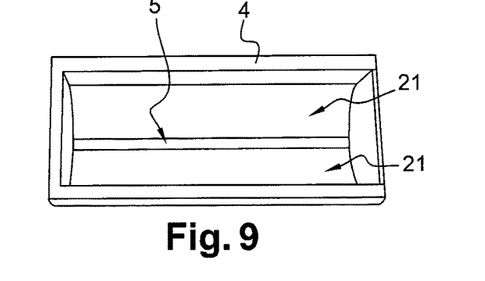
FIG. 9 is an upper view along arrow IX at FIG. 7.
Figure 10:
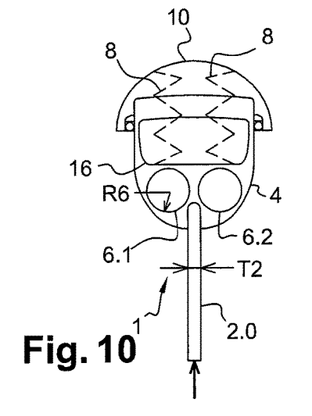
FIG. 10 is a view similar to FIG. 1, the male part being partially inserted into the female part.

In case a removing traction force F2.0 (FIG. 12) is exerted on the plate member 2.0, friction forces F4.1 and F4.2 are generated in the opposite direction, between cylindrical friction retainers 6.1 and 6.2 and the plate member 2.0, causing the cylindrical friction retainers 6.1 and 6.2 to tend to be pulled in direction of the slot 5 where the guide parts 21 form a narrowing gap 22 (FIG. 8). Therefore, due to the narrowing gap 22, the higher the traction force F2.0 is exerted on the plate member 2.0, the stronger the pinch forces F3.1 and F3.2 become.

This induced increase of the intensity of the pinch forces F3.1 and F3.2 results in an increase of the intensity of the friction forces F4.1 and F4.2 which in turn retain the plate member 2.0. The adjustment of the retaining friction forces F4.1 and F4.2 prevents thus from a release or removal of the plate member 2.0 even if the intensity of the traction force F2.0 increases.

Figure 18:
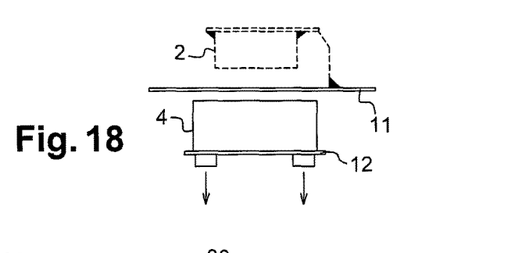
FIG. 18 is a schematic longitudinal view of the fastening device of FIG. 13, where the male part is fully released from the female part.

In order to release the plate member 2.0 from the female part 4, the operator can perform a series of steps as illustrated in the sequence of FIGS. 15 to 20. The operator sequentially displaces the magnets 30 and the truck dashboard component 12 as indicated by the arrows:
- First, the operator brings the magnets 30 in their release position (FIGS. 15, 16 and 19).
- Then, a magnetic force pulls the cylindrical friction retainers 6.1 and 6.2 against the spring force exerted by the biasing components 8 and away from the slot 5 towards an area of the female part 4 where the gap 22 is wider. The cylindrical friction retainers 6.1 and 6.2 are moved until reaching a position (FIG. 3) where the gap 22 is greater than the sum of the diameters of both friction retainers plus the thickness T2 of the plate member 2.0 (gap 22>R6*4+T2). In other words, the cylindrical friction retainers 6.1 and 6.2 are moved until a position where the cylindrical friction retainers 6.1 and 6.2 are not able to generate the retaining friction forces F4.1 and F4.2.
- Hence, the operator can easily withdraw or remove plate member 2.0 from female part 4 through slot 5 (FIGS. 14, 17 to 18).

Ultimately, the operator puts the magnets 30 back into their lock position (FIG. 20), where they exert a weak or null force onto the cylindrical friction retainers 6.1 and 6.2.

Figure 22:
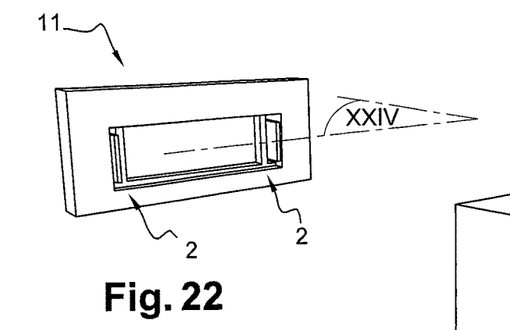
FIG. 22 is a perspective view illustrating a first vehicle component to be fastened according to a fastening method according to the invention using the fastening device of FIGS. 1 to 20.
Figure 23:
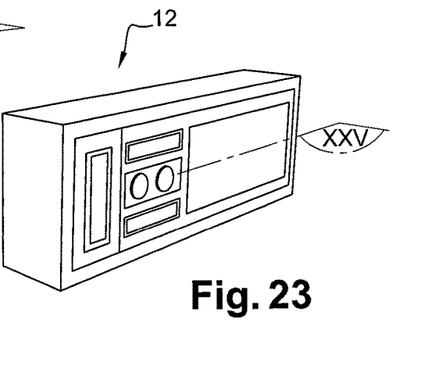
FIG. 23 is a perspective view illustrating a second vehicle component to be fastened to the first vehicle component of FIG. 22.
Figure 24:
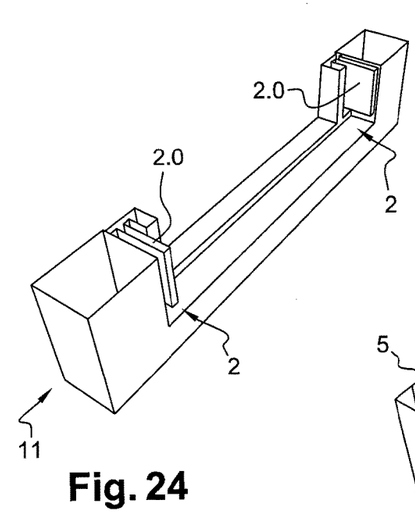
FIG. 24 is a perspective view truncated along plane XXIV at FIG. 22.
Figure 25:
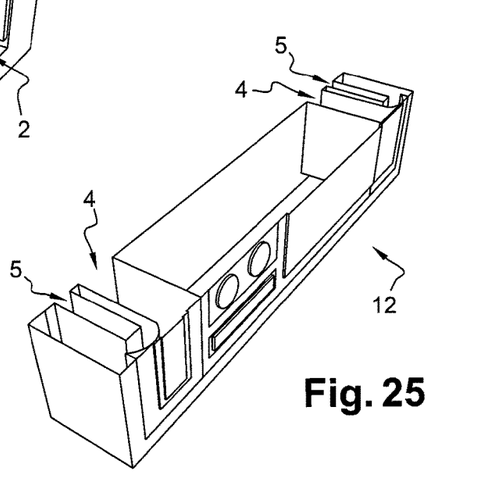
FIG. 25 is a perspective view truncated along plane XXV at FIG. 23.

As can be seen on FIGS. 22 and 24, the truck dashboard 11 may comprise two male parts 2, hence two plate member 2.0 (see FIG. 25), and the truck dashboard component 12 may comprise two female parts 4, hence two slots 5. In the example of FIGS. 23 and 25, the truck dashboard component 12 is a climate control panel.

Figure 19:
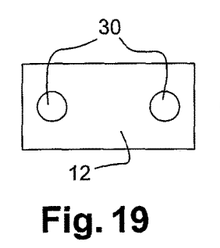
FIG. 19 is a schematic top view of the fastening device of FIG. 18, where two magnets are in the release position.
Figure 20:
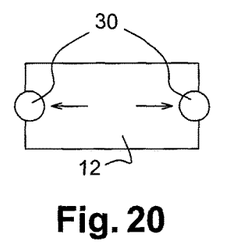
FIG. 20 is a view similar to FIG. 19, where the magnets are moved, for instance, slid from their release position to a lock position.
Figure 21:
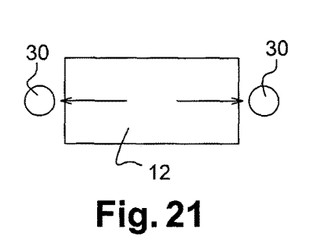
FIG. 21 is a view similar to FIG. 9, where the magnets are removed from their the release position, hence in a lock position.

As illustrated on FIGS. 19 and 20, the magnets 30, used to release the male part 2 from the female part 4, can, for instance, belong to the dashboard component 12. The magnets 30 may be arranged to slide between a locking position (FIG. 20) and an unlocking position (FIG. 19).

Figure 26:
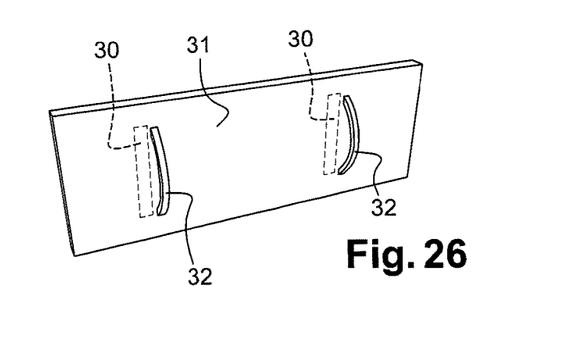
FIG. 26 is a perspective view of a magnet set comprising two magnets.

Alternatively, as illustrated on FIG. 26, the two magnets 30 can be secured to a holding plate tool 31 which has two handles 32 for an operator to accurately manipulate the magnets 30.

FIGS. 27 to 35 illustrate a fastening device 201 according to a second embodiment of the invention. The description of fastening device 1 given above with reference to FIGS. 1 to 20 can be transposed to fastening device 201, with the noticeable exception of the hereafter stated difference(s).

An element of fastening device 201 that has a structure or a function similar or corresponding to that of an element of fastening device 1 is allotted the same reference numeral plus 200. One can thus define a male part 202 with a plate member 202.0 and an insertion direction Z202, a female part 204, a slot 205 opening into the female part 204, a friction retainer 206, a friction zone 207 formed at a free end of the friction zone 207, at least one biasing component 208 and at least one magnet 230, for instance, two magnets 230.

Fastening device 201 differs from fastening device 1, firstly because the friction retainer 206 comprises at least one arm extending parallel to the slot 205, whereas friction retainers 6.1 and 6.2 comprise cylinders. Such as depicted on FIG. 28, 31 or 34, the arm friction retainer 206 can be formed by a rectangular plate. Besides, the female part 204 forms a housing having a shape different from female part 4.

Fastening device 201 differs from fastening device 1, also because fastening device 201 includes no pressure element, whereas fastening device 1 preferably include a pressure element 16.

Figure 27:
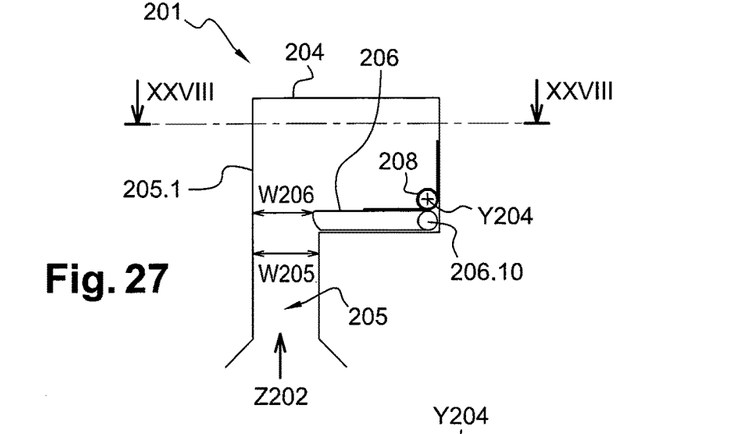
FIG. 27 is a schematic cross-sectional view of a fastening device according to a second embodiment of the invention, with a friction retainer in a locking position.
Figure 28:
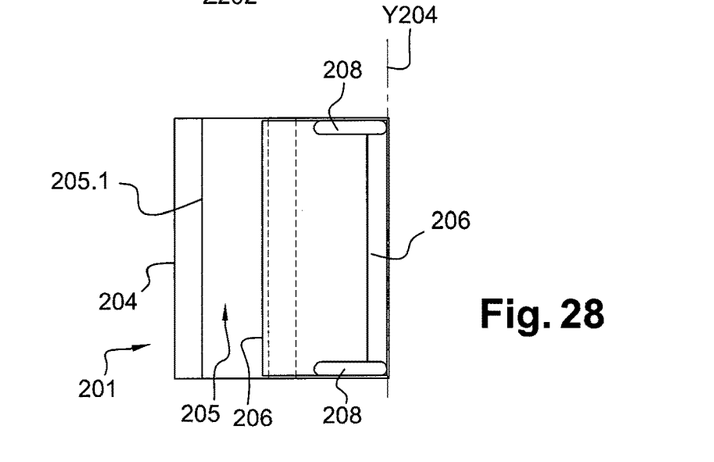
FIG. 28 is a schematic sectional view taken on line XXVIII-XXVIII at FIG. 27.

Moreover, as visible on FIGS. 27 and 28, the fastening device 201 further includes at least one hinge 206.10 for the arm friction retainer 206, the hinge 206.10 linking the arm to the female part 204 and being located on one edge of the rectangular plate forming the arm. The friction zone 207 is formed on the opposite free edge of the arm friction retainer 206.

The arm friction retainer 206 is thus arranged to pivot with respect to the female part 204 about an axis Y204 which is substantially parallel to slot 205. The arm friction retainer 206 may rotate between a first position (FIGS. 33 and 35) where the friction zone 207 is away from the slot 205 and a second position (FIG. 29, 30, 32) where the friction zone 207 is close to the slot 205. The first position corresponds to a release position of the arm friction retainer 206 and the second position corresponds to a locking position of the arm friction retainer 206 when the friction zone 207 is in frictional engagement with the plate member 202.0

The inner side surface 205.1 of the slot 205 that is facing to the arm friction retainer 206 extends up to the inside of the female part 204.

The distance between the inner side surface 205.1 and the friction zone 207 forms a gap W206 that is narrowing when measured perpendicular to the insertion direction Z202 of the plate member 202.0 and when the arm friction retainer 206 is rotating from the first position to the second position. When the arm friction retainer 206 is in the second position the gap W206 is smaller than the width of the slot 205 when measured perpendicular to the insertion direction Z202 of the plate member 202.0.

The plate member 202.0 and the arm are designed such that, in the locking position, the angle a between the arm and a direction perpendicular to the plate member is in the range of 5 to 25°. The arm friction retainer 206 is designed so as to maximize the surface of contact between the plate member 202.0 and the friction zone 207. In the example of FIGS. 27 to 35, the friction zone 207 can be defined by a rounded edge of the arm forming friction retainer 206.

Figures 30, 31, 32, 33, 34, 35:
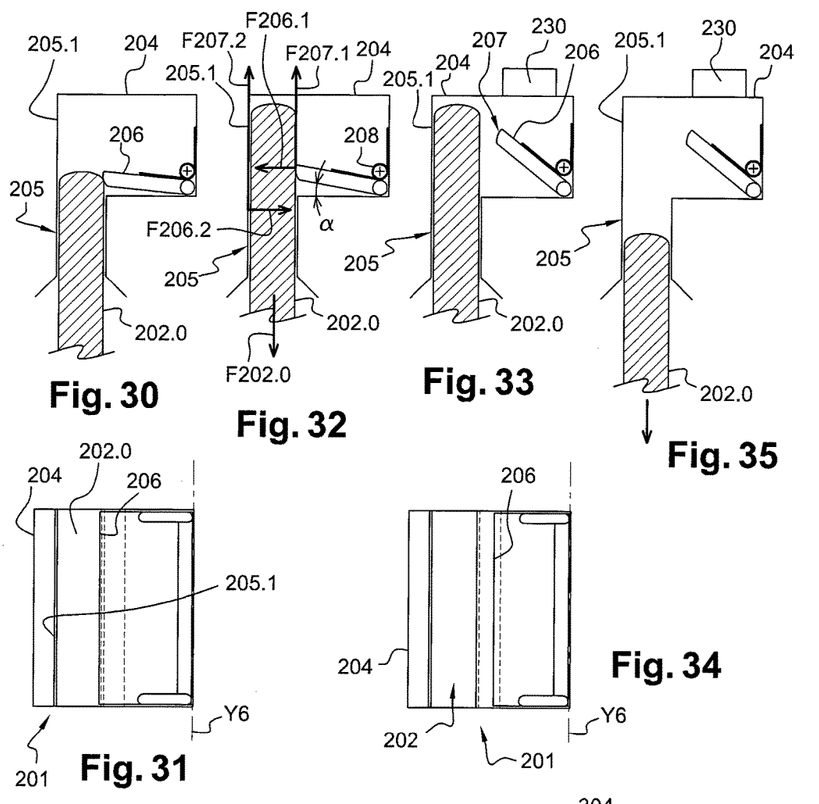
FIG. 30 is a view similar to FIG. 27, where the male part is partially inserted in the female part.
FIG. 31 is a view similar to FIG. 28 in the position of FIG. 30.
FIG. 32 is a view similar to FIG. 27, where the male part is fully inserted in the female part and the friction retainer is in the locking position.
FIG. 33 is a view similar to FIG. 27, where the fastening device includes at least one magnet in a release position.
FIG. 34 is a view similar to FIG. 28 in the position of FIG. 33.
FIG. 35 is a view similar to FIG. 33, where the male part is partially disengaged from the female part.

As can be seen on FIG. 28, 31 or 34, the fastening device 201 may comprise two biasing components 208 that may be constituted of two torsion springs arranged on two opposite sides of the arm friction retainer 206 so as to bias the arm friction retainer 206 towards the second position of the arm friction retainer 206. Herein, each torsion spring is, for instance, made of a torsion helicoidal spring.

Figure 29:
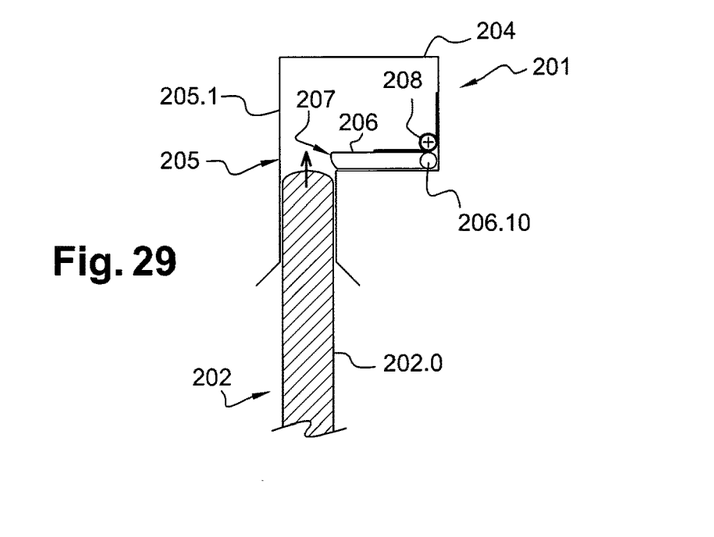
FIG. 29 is a view similar to FIG. 27, where the male part is about to be inserted in the female part.

The sequence of FIGS. 29, 30 and 32 shows the insertion of the male part 202 into the female part 204. The plate member 202.0 first pushes the arm friction retainer 206 against the biasing components 208. Then, plate member 202.0 gets locked by the arm friction retainer 206 in its locking position (FIG. 32).

As soon as the plate member 202.0 is engaged between the arm friction retainer 206 and the inner side surface 205.1, and due to the biasing forces generated by biasing components 208, some initial pinch forces F206.1, F206.2 begin to be generated. A first pinch force F206.1 is exerted by the arm friction retainer 206 on the plate member 202.0 and a second pinch force F206.2, that is opposite to the first one, is exerted by the inner side surface 205.1 on the plate member 202.0. The pinch forces F206.1 and F206.2 are called "pinch", because they tend to pinch or press the plate member 202.0 between the arm friction retainer 206 and the inner side surface 205.1.

In case a removing traction force F202.0 (FIG. 32) is exerted on the plate member 202.0, friction forces F207.1 and F207.2 are generated in the opposite direction of the removing traction force F202.0. The friction force F207.1 is generated between the plate member 202.0 and the arm friction retainer 206 in one side and the friction force F207.2 is generated between the plate member 202.0 and the inner side surface 205.1 on the other side. Because the arm friction retainer 206 is in frictional engagement with the plate member 202.0, the removing traction force F202.0 causes the arm friction retainer 206 to tend to rotate more again towards the second position. In other words, the removing traction force F202.0 tends to pull the arm friction retainer 206 in direction of the slot 205. When the arm friction retainer 206 is rotated towards the second position, the gap W206 is narrowing (see FIG. 27). Therefore, due to this narrowing gap W206, the higher the traction force F202.0 is exerted on the plate member 202.0, the stronger the pinch forces F206.1 and F206.2 become.

This induced increase of the intensity of the pinch forces F206.1 and F206.2 result in an increase of the intensity of the friction force F207.1 and F207.2 which in turn retain the plate member 202.0. The adjustment of the retaining friction forces F207.1 and F207.2 prevents thus from a release or removal of the plate member 202.0 even if the intensity of the traction force F202.0 increases.

To release the male part from the female part, an operator can perform the steps illustrated by the sequence of FIGS. 33 to 35. The operator places the magnets 230 in their release position. Thus, magnets 230 exert on the arm friction retainer 206 a magnetic force superior to the biasing forces exerted by the biasing device 208 on the arm friction retainer 206. And the operator withdraws plate member 202.0 from female part 204 through slot 205.

FIGS. 36 and 37 illustrate a fastening device 301 according to a third embodiment of the invention. The description of fastening device 201 given above with reference to FIGS. 27 to 35 can be transposed to fastening device 301, with the noticeable exception of the hereafter stated difference(s).

An element of fastening device 301 that has a structure or a function similar or corresponding to that of an element of fastening device 1 is allotted the same reference numeral plus 100. One can thus define a male part 302 with a plate member 302.0, a female part 304, a slot 305, hinges 306.10 and 306.20, and biasing components 308.

Fastening device 301 differs from fastening device 201, because fastening device 301 includes two friction retainers 306.1, 306.2, whereas fastening device 201 only includes one friction retainer 206.

Each friction retainer 30'6.1 and 306.2 comprises an arm extending parallel to the slot 305. As can be seen on FIG. 36, the arm friction retainers 306.1 and 306.2 are arranged symmetrically on each side of slot 305.

In the fastening device 301 according to the third embodiment, the plate member 302.0 is pinched between both arm friction retainers 306.1 and 306.2 which retain the plate member 302.0 when a traction force F202.0 is exerted on the plate member 302.0.

In order to increase friction forces F4.1, F4.2, F207.1, F207.2, at least the friction zones 7.1, 7.2, 207 may have a rough surface quality or a corrugated surface. For instance, in the first embodiment depicted on FIGS. 1 to 20, when diameter of cylindrical friction retainers 6.1 and 6.2 is comprised between 5 and 25 mm the plate member 2.0 may have a roughness surface such as the Ra(pm) value is comprised between 0.8 and 3.2. In another variant and in order to increase friction forces F4.1, F4.2, F207.1, F207.2, friction retainers (6.1, 6.2, 206) may also be covered by a layer of deformable material such as an elastomer material.

The invention claimed is:

1. A fastening device, for reversibly assembling a first vehicle component and a second vehicle component, wherein the fastening device includes at least:
    a male part suitable for being secured to a first vehicle component, the male part comprising a plate member,
    a female part suitable for being secured to a second vehicle component, the female part presenting a slot suitable for the insertion of the plate member,
    at least one friction retainer comprising a friction zone, the friction retainer being movable at least between:
        a locking position, in which the at least one friction zone is in frictional engagement with the plate member when the plate member is inserted through the slot, and
        a releasing position, in which the at least one friction zone is not in frictional engagement with the plate member such that the plate member may be removed from the slot,
    at least one biasing component arranged to bias the at least one friction retainer towards the locking position such that the friction zone is in frictional engagement with the plate member so as to prevent the plate member from moving relative to the slot,
    wherein the at least one friction retainer is at least partially composed of a magnetic material such that a predetermined magnetic force can move the at least one friction retainer towards the releasing position and against a biasing force generated by the biasing component, and
    at least one magnet manually movable between:
        a lock position, in which the magnetic force exerted by the at least one magnet on the at least one friction retainer is substantially smaller than the biasing force exerted by the at least one biasing component on the at least one friction retainer, so that the at least one friction retainer is kept in its locking position, and
        a release position, in which the magnetic force exerted by the at least one magnet on the at least one friction retainer is substantially greater than the biasing force exerted by the at least one biasing component on the at least one friction retainer, so that the at least one friction retainer is moved towards its releasing position.

2. The fastening device according to claim 1, wherein the at least one friction zone extends substantially along a friction line.

3. The fastening device according to claim 2, wherein the at least one friction line is straight, wherein the plate member has a planar friction area arranged to engage with the at least one friction zone, and wherein the slot has a substantially rectangular form.

4. The fastening device according to claim 1, wherein the plate member has a substantially rectangular cross-section, across a plane perpendicular to an insertion direction of the plate member into the slot, the rectangular cross-section having a length over thickness ratio greater than 4.

5. The fastening device according to claim 4, wherein a primary ratio where:
    the numerator is the radius of the at least one cylinder, and
        the denominator is the thickness of the rectangular cross-section of the plate member is greater than 1.

6. The fastening device according to claim 1, wherein the at least one friction retainer is located in the female part.

7. The fastening device according to claim 1, including at least two friction retainers, the friction retainers being located on either side of the slot.

8. The fastening device according to claim 7, further including at least two guide parts arranged to guide the cylinder towards the slot, wherein each friction retainer comprises a cylinder extending substantially parallel to the slot, guide parts extending on either side of the slot to guide a respective cylinder towards the slot when the corresponding friction retainer moves from the releasing position to the locking position.

9. The fastening device according to claim 7, wherein the at least one friction retainer comprises an arm extending parallel to the slot, each arm being arranged to pivot with respect to the female part about an axis substantially parallel to the slot, and wherein each friction retainer comprises a corresponding arm extending parallel to the slot.

10. The fastening device according to claim 1, wherein the at least one biasing component is connected to the female part.

11. The fastening device according to claim 1, wherein the at least one biasing component comprises at least one spring arranged to bias the at least one friction retainer.

12. The fastening device according to claim 1, wherein the at least one friction retainer and the at least one biasing component, are movable according to a direction that is substantially parallel to an insertion direction of the male part through the slot.

13. The fastening device according to claim 1, further including a pressure element arranged inside the female part between the at least one biasing component and the at least one friction retainer so as to transmit forces from the at least one biasing component to the at least one friction retainer, the pressure element being slidable according to a direction that is substantially parallel to an insertion direction of the male part through the slot.

14. The fastening device according to claim 1, wherein the at least one friction retainer comprises a cylinder having a circular cross-section and extending substantially parallel to the slot, the cylinder being free to move inside the female part when the friction retainer lies in the releasing position.

15. The fastening device according to claim 14, further including at least one guide part arranged to guide the cylinder towards the slot.

16. The fastening device according to claim 15, wherein the at least one guide part comprises a wall of the female part, the wall defining a gap progressively narrowing towards the slot.

17. The fastening device according to claim 1, wherein the at least one friction retainer comprises an arm extending parallel to the slot, each arm being arranged to pivot with respect to the female part about an axis substantially parallel to the slot.

18. The fastening device according to claim 17, wherein the at least one biasing component comprises at least one torsion spring arranged to bias the at least one friction retainer in a biasing direction substantially perpendicular to the slot.

19. The fastening device according to claim 17, wherein the friction zone is defined by a rounded edge of the arm.

20. The fastening device according to claim 17, wherein the at least one arm is designed to define, in its locking position, a lock gap having a width smaller than the width of the slot when measured perpendicularly to the insertion direction of the plate member.

21. The fastening device according to claim 17, wherein the plate member and the at least one arm are designed such that, in the locking position, an angle between the arm and a direction perpendicular to the plate member is in the range of 5° to 25°.

22. A fastening method, for reversibly assembling a first vehicle component and a second vehicle component, wherein the fastening method includes the steps of:
supplying a fastening device according to claim 1,
inserting the plate member into the slot until the at least one biasing component has moved the at least one friction retainer in its locking position.

* * * * *